Patented Sept. 15, 1936

2,054,270

UNITED STATES PATENT OFFICE 2,054,270

PRODUCTION OF PHENOLIC COMPOUNDS

Walter Schoeller and Hans Jordan, Berlin, Germany, assignors to the firm Schering-Kahlbaum A. G. Berlin, Berlin, Germany No Drawing. Application March 12, 1929, Serial No. 346,494. In Germany March 23, 1928

15 Claims. (Cl. 260—150)

Our invention relates to the production of phenol ethers and alkylated phenols. It is an improvement upon the process described and claimed in U. S. Patent No. 1,835,344 according to which alkylated phenols, such as for instance 3-methyl-isopropyl phenol (thymol) are obtained by heating an alkyl ether, such as for instance the isopropyl ether of meta cresol, under pressure in the presence of a surface catalyst.

We have now found that this method is greatly improved if the conversion of the phenol ether is effected in the operation resulting in or directly after its formation.

Unsaturated hydrocarbons such as for instance ethylene, propylene, butylene etc. or cyclic hydrocarbons such as for instance cyclohexene, or compounds which are capable of forming unsaturated hydrocarbons, as described in U. S. patent to Freund, No. 1,672,378, are suitable for use in our process. In the acknowledged patent to Freund olefines are produced by heating organic compounds, which carry hydrogen and hydroxyl on two adjacent carbon atoms in an aliphatic system, with a surface catalyst. These organic compounds may be represented by the following structural formula:

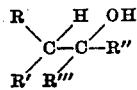

wherein R, R', R'' and R''' signify any monovalent groups. In the specific examples of this acknowledged patent cyclohexanol, glycerine and borneol are heated with surface catalysts to produce the desired unsaturated compounds.

In accordance with our invention the unsaturated compounds mentioned are caused to act on a phenol in the presence of a surface catalyst such as silica gel, fuller's earth or the like, at first the corresponding phenol ether is formed which is however gradually converted into a corresponding alkylated phenol. Therefore there is always formed besides the phenol ether a certain quantity, depending from the operating conditions of each individual case, of alkylated phenols. If the period of reaction is only short and the temperature comparatively low, the final product will mainly consist of phenol ether, while only 10-15% alkylated phenols are formed. At higher temperatures and longer periods of reaction greater quantities of alkylated phenols are formed. It is therefore possible, according to the time and temperature of reaction, to produce mainly phenol ethers or alkylated phenols.

In view of the fact that the unsaturated hydrocarbons according to Patent No. 1,672,378 are readily available, the production of phenol ethers according to the present invention offers great advantages as compared to the methods hitherto practiced. The specific compounds disclosed in the acknowledged Freund patent, as starting materials for producing unsaturated compounds, are all alcohols. The reaction involved results in a dehydration of these alcohols by heating with the surface catalysts. In our present process, therefore, alcohols are suitable which are capable of being dehydrated upon heating with these surface catalysts.

The term "unsaturated hydrocarbons" is intended to include also gas mixtures as produced for instance in coke ovens, which contain considerable quantities of ethylene, propylene, butylene etc. Such gas mixtures may be introduced under pressure into the mixture of the phenol and the catalyst, the alkylenes being absorbed by this mixture. The saturated hydrocarbons contained in the gas mixture may be continuously removed by suitable means such as a cooler operating under pressure, a reducing valve or the like.

According to the quantity of the hydrocarbons introduced and to the duration of reaction also polysubstituted phenols or their alkyl ethers can be obtained inasmuch as after the alkyl has entered the nucleus, the phenol hydroxyl group is again etherified and a further conversion takes place. If polysubstitution is undesirable, we prefer choosing the proportion of hydrocarbon or compound forming hydrocarbon to phenol in such manner that the phenol is slightly in excess.

If a mixture of gases, as above mentioned, is used, there results a mixture of ethylated, propylated and butylated phenols or cresols (if cresol is used), which can easily be separated by fractionation, if desired, but which may also be used as such for many uses such as disinfection, deodorization etc.

Our invention does not include reacting together propylene and m-cresol in the presence of a catalyst to form thymol and other propyl derivatives of m-cresol, this forming the subject matter of U. S. Patent No. 1,886,311 to Skraup, Schöllkopf, and Serini.

Example 1.—Propylene is forced under pressure into a mixture of phenol with 10 per cent of Tonsil or fuller's earth, placed in an autoclave provided with a stirrer and heated to about 140° C., until about 40-45 parts by weight propylene have been absorbed, which takes only a very short time, as a rule a few minutes. If the contents of the autoclave is at once subjected to further treatment, the isopropyl ether of phenol and a small quantity of n-propyl ether are obtained. If the reaction mixture is maintained at a somewhat more elevated temperature during a few hours, there results p-isopropyl phenol and a small quantity of p-n-propylphenol.

Example 2.—A mixture of 96 parts by weight phenol, 80 parts cyclohexene and 30 parts Tonsil are heated in an autoclave provided with a stirrer. At about 135° C. the pressure rises of a sudden, together with a spontaneous rise in temperature of about 40°, whereupon the pressure drops again after the lapse of a few seconds. If treated further at once, the product is found to be the cyclohexyl ether of the phenol. By stirring a few hours at 190–200° C. p-cyclohexyl phenol is obtained.

Example 3.—A mixture of 108 parts m-cresol, 80 parts cyclohexene and 35 parts Tonsil is treated as described with reference to Example 2. The reaction proceeds as quickly as in the case of phenol. If the product is treated at once, there results the cyclohexyl ether of m-cresol. By stirring a few hours at 190–200° C., 1-methyl-4-cyclohexyl-5-hydroxy benzene is formed.

Example 4.—Equal parts of phenol and cyclohexanol are heated in an autoclave, provided with a stirrer, to 170 to 190° C. with about 20% Tonsil, calculated on the total weight of the two other components. The condensation into an ether is finished after about 20 minutes. If stirring is continued at 190–200° C., conversion as described in Example 2 takes place. Preferably before the conversion the water of reaction is allowed to blow off.

Example 5.—A mixture of phenol with about 20% Tonsil is heated to 180–200° C. in an autoclave provided with a stirrer and with a controlled gas exhaust. Coke ove gases are forced into the autoclave under a pressure of about 5–7 atm. and the gas exhaust is regulated in such manner that in the exhaust gases only small quantities of olefines can be traced. According to the quantity of the gas forced in and to the duration of the reaction there result mixtures of phenol alkyl ethers or mono- or poly-alkylated phenols or their alkyl ethers. Instead of phenol m-cresol may be used.

From the product of reaction thymol may be separated in a well known manner.

Various changes may be made in the details disclosed in the foregoing specification without departing from the invention or sacrificing the advantages thereof.

The term "surface catalyst" used in the claims is meant to designate a substance having a high degree of porosity and consequent catalytic action.

We claim:

1. The process of producing alkyl ethers of phenols and alkylated phenols comprising causing an olefine to act in the presence of a surface catalyst at 135–200° C. on a phenolic body.

2. The process of producing alkyl ethers of phenols and alkylated phenols comprising causing a cyclic olefine to act in the presence of a surface catalyst at 135–200° C. on a phenolic body.

3. The process of producing alkyl ethers of phenols and alkylated phenols comprising causing a mixture containing at least one olefine to act in the presence of a surface catalyst at 135–200° C. on a phenolic body.

4. The process of producing alkyl ethers of phenols and alkylated phenols comprising causing a gas mixture containing at least one olefine to act in the presence of a surface catalyst at 135–200° C. on a phenolic body.

5. The process of producing alkyl ethers of phenols and alkylated phenols comprising causing an olefine to act in the presence of a surface catalyst at a temperature above 100° C. on a phenolic body.

6. The process of producing alkyl ethers of phenols and alkylated phenols comprising causing a cyclic olefine to act in the presence of a surface catalyst at a temperature above 100° C. on a phenolic body.

7. The process which comprises reacting together at elevated temperatures and in the presence of a surface catalyst, a phenolic body and an organic compound having an olefinic bond in which said olefinic bond is the most reactive part of the molecule of said organic compound under the conditions of said reaction.

8. The process of producing alkyl ethers of phenols and alkylated phenols which comprises reacting together at elevated temperatures and in the presence of a surface catalyst, a phenolic body and a reactive organic body selected from a class consisting of olefines and gases containing olefines.

9. The process of producing alkyl ethers of phenols and alkylated phenols which comprises reacting together at elevated temperatures and in the presence of a surface catalyst, a phenolic body and a reactive organic body selected from a class consisting of olefines, gases containing olefines and organic compounds capable of forming olefines during the course of and under the conditions of the said reaction.

10. The process of producing alkyl ethers of phenols and alkylated phenols which comprises reacting together at elevated temperatures and in the presence of a surface catalyst, a phenolic body and a reactive organic compound capable of forming an olefine during the course of and under the conditions of the said reaction.

11. The process of producing alkyl ethers of phenols and alkylated phenols which comprises reacting together at elevated temperatures and in the presence of a surface catalyst, a phenolic body and an alcohol capable of reacting during the course of and under the conditions of the said reaction to form an olefine.

12. In the manufacture of alkyl ethers of phenols and alkylated phenols, the process which comprises reacting together at elevated temperatures and in the presence of a surface catalyst, propylene and phenol.

13. In the manufacture of alkyl ethers of phenols and alkylated phenols, the process which comprises reacting together at elevated temperatures and in the presence of a surface catalyst, a phenol and a compound selected from a class consisting of cyclohexene and cyclohexanol.

14. In the manufacture of alkyl ethers of phenols and alkylated phenols, the process which comprises reacting together at elevated temperatures and in the presence of a surface catalyst, a phenol and coke oven gases.

15. In the manufacture of alkyl ethers of phenols and alkylated phenols, the process which comprises reacting together at elevated temperatures and in the presence of a surface catalyst, phenol and cyclohexene.

WALTER SCHOELLER.
HANS JORDAN.